UNITED STATES PATENT OFFICE.

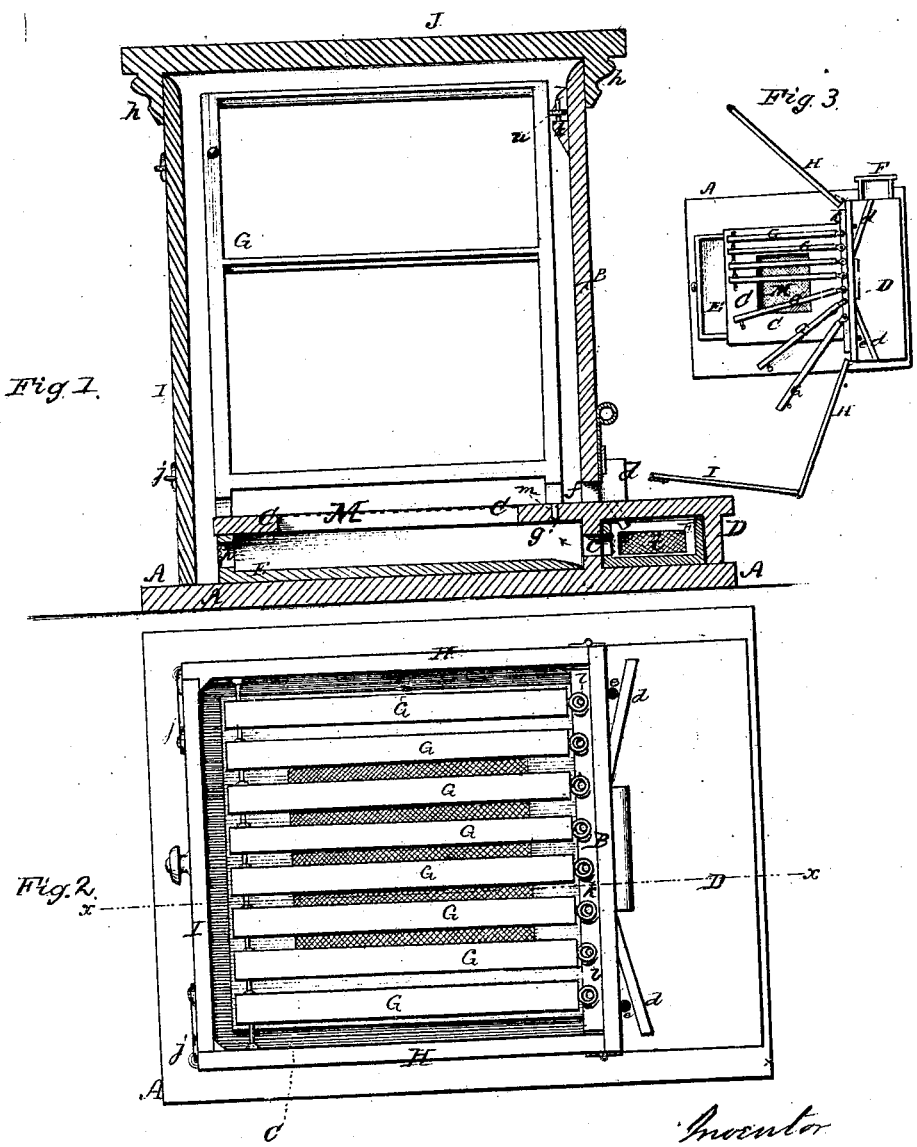

ELIZA JANE DONAVAN, OF INDIANAPOLIS, INDIANA, ASSIGNOR TO HERSELF AND W. T. GIBSON, OF SAME PLACE.

IMPROVEMENT IN BEE-HIVES.

Specification forming part of Letters Patent No. 108,893, dated November 1, 1870.

*To all whom it may concern:*

Be it known that I, Mrs. ELIZA JANE DONAVAN, of Indianapolis, in the county of Marion and State of Indiana, have invented certain Improvements in Bee-Hives, of which the following is a specification, reference being had to the accompanying drawing.

My invention consists in a novel construction and arrangement of the parts of a beehive, as hereinafter described.

Figure 1 is a vertical section of my hive, taken on the line $x$ $x$ of Fig. 2; Fig. 2, a top-plan view of the hive with the top removed; and Fig. 3, a plan view of the hive with the top removed, the body or case opened, and the tray and moth-box drawn partially out.

On the base A, in front of and against the hive-front B, I place a flat box, D, having inserted from one end a drawer, F, the box and its drawer both having openings through their ends, with wire-gauze over the same, as at $t$, Fig. 1.

The top of the box D serves as a lighting-board for the bees, and flush therewith I make an opening or entrance, $f$, through the front B, as shown in Fig. 1.

For the purpose of entrapping any bee-moths who may find their way onto the lighting-board, and prevent their entrance into the hive, I secure upon the lighting-board two strips, $d$, extending from the sides of the entrance $f$ obliquely outward to near the sides of the lighting-board, and behind each of these strips, between it and the front, I make a small opening, $e$, extending obliquely through the lighting-board, and opening over or above the drawer F.

In each of these openings I secure a tube, which projects beyond the under face of the lighting-board, as shown in Fig. 1. Now, the habit of the bee-moth is to descend wherever possible, and to seek cracks, crevices, and protected places; therefore, when a moth finds his way onto the lighting-board, instead of passing through the open entrance $f$ into the hive, he will follow along the lower edge of one of the guide-strips $d$, in the angle formed between the strip and the lighting-board. He will continue his course thus around the end and along the back of the strip until he reaches the hole $e$, when he will descend through the same and fall into the drawer F, from whence he cannot escape.

To the base A, against side, B, I secure a flat rectangular box, C, of the same height as box D, leaving a considerable space between the box and the sides of the case or body, as shown in Fig. 1.

Through the lower end of side B, and through the adjoining side of drawer F, I cut an opening, $c$, so as to form a communication between the boxes C and D.

The back side of the box C, I leave open, and then insert therein a drawer or tray, E, and in the top of the box cut a large rectangular opening, M, as shown.

In the outer end of the drawer E, I cut a hole, $p$, and over this hole, and the openings M and $c$, I secure wire-gauze, as shown, to prevent the passage through them of bees, moths, or other insects.

The object of the large opening M is principally to allow all dirt, filth, obstructions, &c., to fall through into the tray or drawer E so that by removing and emptying the drawer the whole bottom of the hive is thereby cleaned, and that without disturbing in any way the bees.

In the old forms of hives, at certain times, the dirt, &c., accumulates faster than the bees can carry it away, and engenders disease, and, owing to the construction of the hives, it cannot be removed by the attendant without disturbing both the bees and the comb; but in my hive this trouble is entirely obviated.

The hive being thus arranged, and the various parts being closed, air passes in through the ends of box D, and thence through opening $c$ into box C, and out through openings M and $p$, upward between and around the frames G, and out through the cracks and crevices in the body.

The upper edges of the sides of the body I bevel off to an edge, as shown in Fig. 1, so as to prevent the bees from lighting thereon and being crushed by the top J when the same is applied.

Having thus described my invention, what I claim is—

1. The combination of the box D and drawer F with the strips $d$ and holes $e$, arranged at the front of the hive, as set forth.

2. The arrangement of the perforated bottom M, having the drawer E, with its covered air-passages $p$ and $c$ located underneath, and the box D and drawer F, with their covered air-passages, all as set forth.

ELIZA JANE DONAVAN.

Witnesses:
ALEX. METZGER,
DAVID T. HAND.